United States Patent Office.

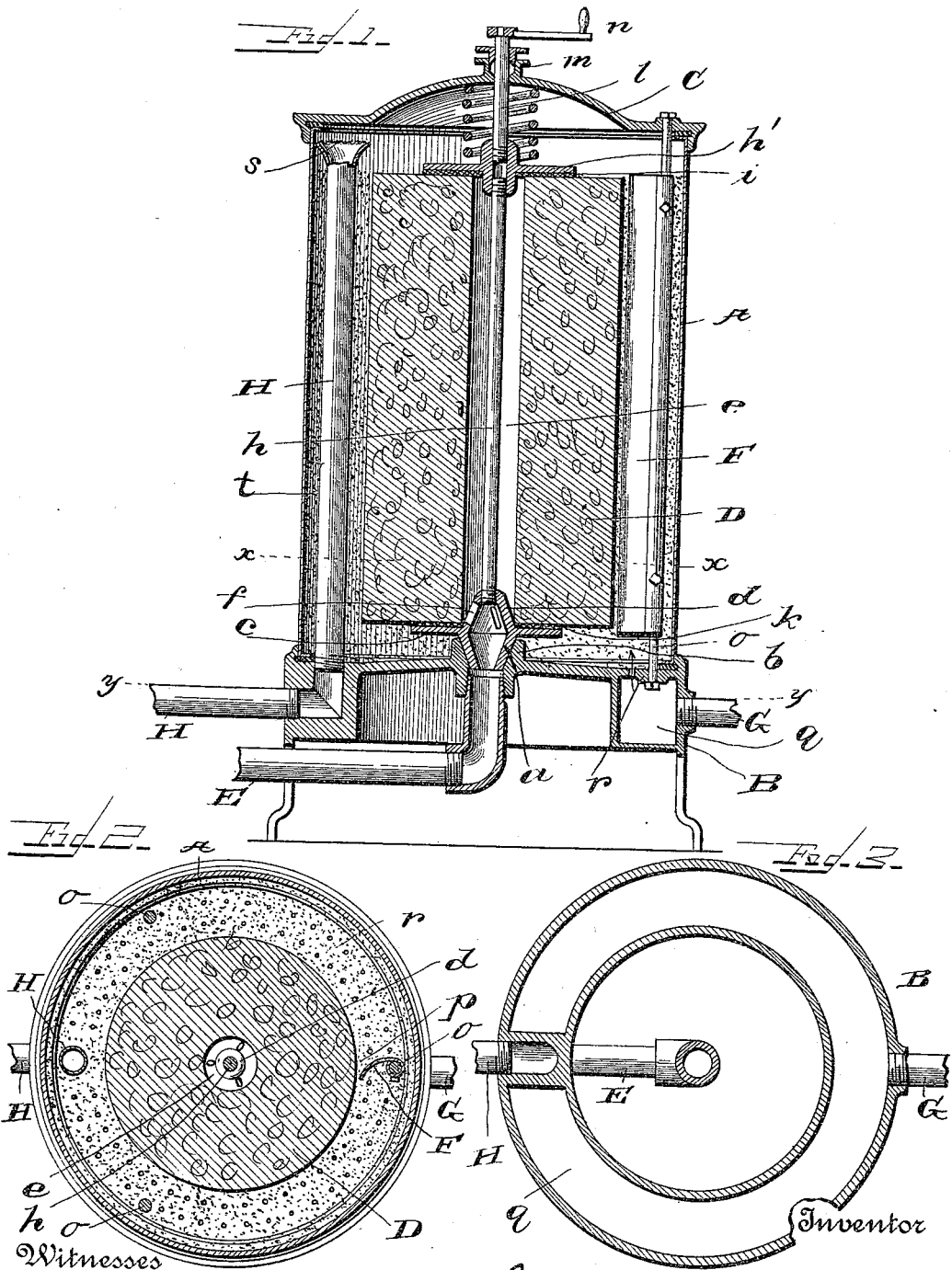

JOHN M. DAVIDSON, OF ALLEGHENY, ASSIGNOR, BY DIRECT AND MESNE ASSIGNMENTS, OF TWO-THIRDS TO C. Y. MERCER AND THE SHOOK, ANDERSON MANUFACTURING COMPANY, (INCORPORATED,) OF PITTSBURG, PENNSYLVANIA.

FILTER.

SPECIFICATION forming part of Letters Patent No. 544,291, dated August 13, 1895.

Application filed November 27, 1894. Serial No. 530,178. (No model.)

*To all whom it may concern:*

Be it known that I, JOHN M. DAVIDSON, a citizen of the United States, residing at Allegheny, in the county of Allegheny and State of Pennsylvania, have invented certain new and useful Improvements in Filters; and I do hereby declare the following to be a full, clear, and exact description of the invention, such as will enable others skilled in the art to which it appertains to make and use the same.

My present invention relates to filters, and has especial reference to that class of filters which use a tubular porous filtering-body, such as stone or composition, through which the water is required to pass. In this class of filters the periphery of the filtering-body becomes rapidly coated with the impurities of the water, and these impurities must be forcibly removed, to accomplish which scrapers, brushes, pebbles held stationary in compartments, &c., have been used, but owing to the softness of the filtering-body these cleaning devices wear the filtering-body away very rapidly and require the removal of the cleaning devices for readjustment with reference to the filtering-body in order to keep them effective. This wearing away of the filtering-body and the cleaning device after a time results in defective cleaning until the filter becomes inoperative, when the cleaner must be adjusted.

It is my purpose to keep the filter up to its maximum filtering capacity from the time it is put into use until the filtering-body is worn out by providing a granular bed which surrounds the filtering-body and serves, first, to arrest the coarse and major portion of the impurities when filtering, and then to scour the inner surface of the filter-casing and outer surface of the filtering-body while the granular bed is being cleansed by attrition of its particles, and thus avoid the necessity of removing the cover of the filter except to renew the filtering material.

With this object in view the invention will be fully disclosed in the following specification and claims.

In the accompanying drawings, which form part of this specification, Figure 1 represents a vertical section of my improved filter; Fig. 2, a top plan view of the line $x\ x$, Fig. 1, and Fig. 3 a transverse section on the line $y\ y$.

Reference being had to the drawings and the letters thereon, A indicates the casing of the filter, B the base, and C the cover. Within the casing and concentric therewith is a tubular filtering-body D, of porous stone or composition, such as is commonly used for the purpose, and said body is supported upon a hollow journal $a$, which engages a bearing $b$ on the base B. The journal is provided with a concentric flange $c$ and with an extension $d$, which enters the filtered water-chamber $e$ of the filtering-body D, and in the wall of the extension are openings $f$ for the passage of filtered water to the discharge-pipe E. The journal $a$ is secured to the body D by a rod $h$, which engages the extension $d$ and the disk $h'$ at the upper end of said body, and the body is securely clamped between the flange $c$ and the disk $h'$, so that they will revolve together on the journal $a$; and between the ends of the body D and the flange $c$ and disk $h'$ are packing-gaskets $i\ k$ to prevent unfiltered water entering the chamber $e$.

From the disk $h'$ extends an arm $l$, through the cover C and its stuffing-box $m$, which is provided with a crank $n$ to revolve the body D when it is desired to cleanse the body of the impurities which accumulate on its surface.

F indicates a vertical bar attached to one of the rods $o$, which secure the base and the cover to the body of the filter and is set at an angle to the periphery of the filtering-body D to form a funnel-shaped passage $p$ to direct the granules against the body when the filter-bed is being cleansed.

In the base B is a concentric water-supply chamber $q$ provided with a pipe G and a foraminous upper side $r$, through which water issues in numerous fine streams, and an overflow or waste pipe H is attached to the base on the side opposite the supply-pipe G and extends up through the filter to the upper end, and the mouth of the pipe is covered with a fine wire-screen $s$ to prevent waste of the granular bed $t$ when it is being cleansed.

The several pipes E, G, and H are supplied with stop-cocks (not shown) to regulate the supply and discharge of water.

In the operation of filtering water the water enters the chamber $q$ through pipe G, and is distributed through the holes in the upper side $r$ of the chamber, so as to pass evenly up through the granular bed, where the water is relieved of the coarse and major portion of its impurities and then passes through the wall of the filter-body D into the chamber $e$, from which it passes through the openings $f$ in the extension $d$ into the discharge-pipe E.

To cleanse the filter the pipe E is closed and the pipes G and H opened, when the water loosens and raises the granular bed, and as the filter-body D is revolved the granules acquire a circular motion imparted by the revolving body, and as they pass between the bar F and the surface of the body they scour and remove the accumulated slime and other impurities from said body. At the same time the granules as they are dashed about cleanse themselves by attrition of adhering impurities and also scour the inner surface of the body A of the filter and cleanse it, while the impurities rise to the upper end of the filter and flow through the waste-pipe H, thus avoiding the necessity of removing the cover of the filter and cleansing the inner surface of the body A of the filter by hand.

Having thus fully described my invention, what I claim is—

1. A filter provided with a revoluble tubular filtering body and a granular bed surrounding said body in combination with an inclined deflector for directing free granular material against the periphery of the body.

2. A filter provided with a revoluble tubular filtering body and a free granular bed surrounding said body, an inclined deflector and means for raising said bed and scouring the walls of the filter and filtering material.

3. A filter provided with a base having a concentric water-chamber provided with perforations in its upper side and a hollow journal bearing, in combination with a revoluble filtering body supported on said bearing and a spring between the cover of the filter and the filtering-body.

4. A filter provided with a revoluble filtering body, a granular bed surrounding said body, and a bar set at an angle to the periphery of the body, in combination with a water supply below the granular bed and a waste pipe above said bed.

In testimony whereof I affix my signature in presence of two witnesses.

JOHN M. DAVIDSON.

Witnesses:
D. C. REINOHL,
D. W. REINOHL.